UNITED STATES PATENT OFFICE.

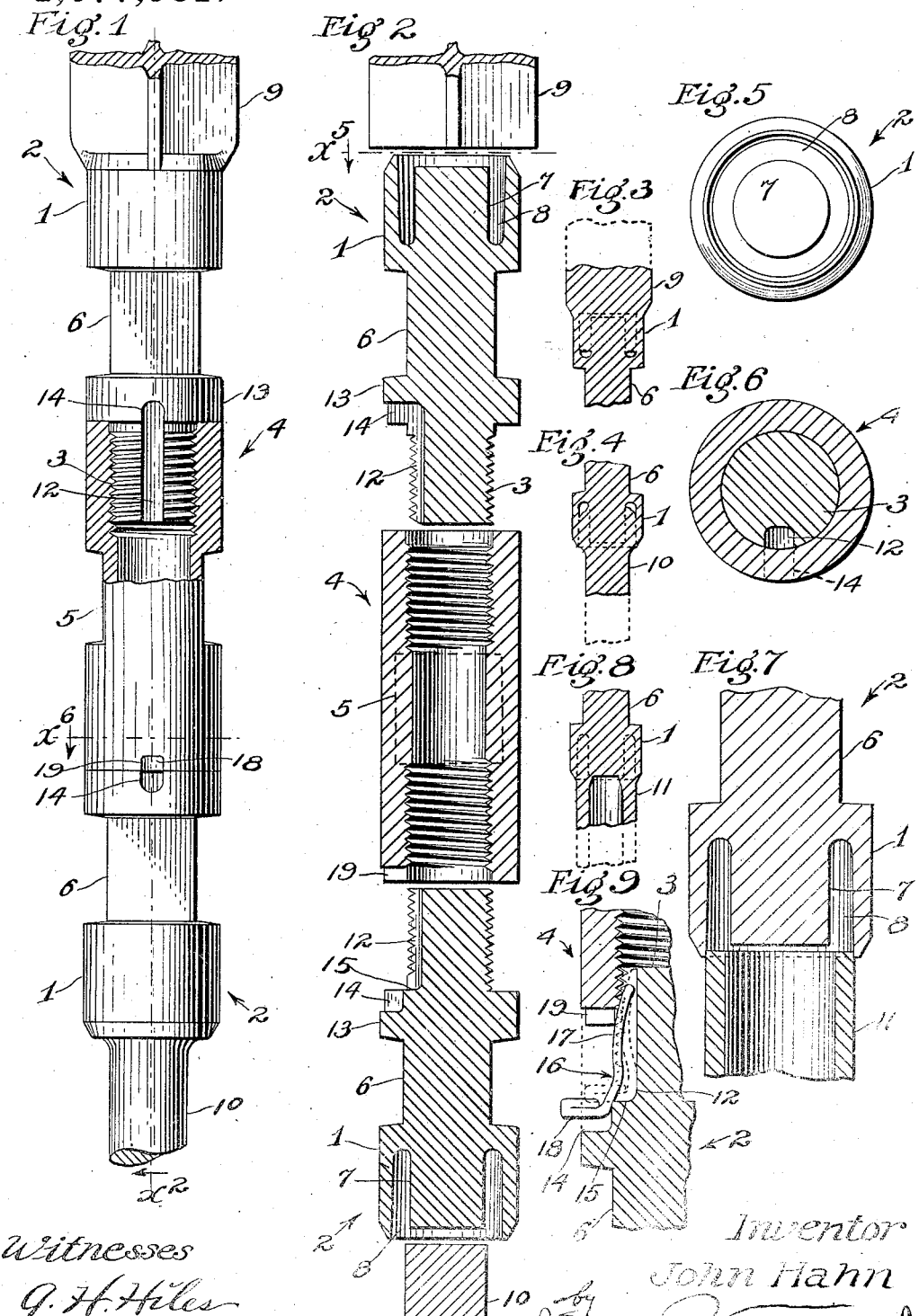

JOHN HAHN, OF LOS ANGELES, CALIFORNIA.

SUCKER-ROD AND THE LIKE.

1,077,931.   Specification of Letters Patent.   Patented Nov. 4, 1913.

Application filed June 11, 1912. Serial No. 703,076.

*To all whom it may concern:*

Be it known that I, JOHN HAHN, a citizen of the United States, residing at Los Angeles, in the county of Los Angeles and State of California, have invented a new and useful Sucker-Rod and the like, of which the following is a specification.

This invention relates to the sucker rods of deep well pumps in which metal coupling members as boxes and pins or pins alone are welded to the ends of metal intermediate bodies.

In such structures the coupling members are of greater cross-sectional area than the rod bodies to be welded thereto and an object of this invention is to produce a rod of superior strength and to do this in a practical, economical and effective manner either by electric welding or gas welding.

An object of the invention is to obtain maximum strength at the welds.

In the process known as butt welding it has been the practice heretofore to make the welding stubs of the members to be joined of substantially the same cross sectional area and form, and the members were quickly forced together, in consequence of which the welding operation was prolonged and resulted in raising the jaws and other parts of the welding machine to a high temperature and the effect on the weld was to produce more or less crystallization of the metal forming the weld so that fracture was liable to occur at the weld.

I have discovered that in order to avoid crystallization of the metal at the weld and to secure maximum strength thereof, the welding portions of the members to be joined must be raised to a high degree of heat over less length of the members than has heretofore been customary, and this may be done by first turning on the electric current, then slightly contacting the two members with one another to cause burning and flying away of the metal at the electric contact until the metal at the contact has been raised to a welding heat and then slowly forcing the members together until the members have been brought to a welding temperature for an inch, more or less, after which the current is turned off and the members are quickly forced yet more toward one another to complete the weld.

In the method just described, considerable metal is brought to the welding temperature, in consequence of which, if no preventive provision is made the metal at the weld spreads and is forced outward, thus making large rough burs which must be removed by grinding or the like, thus adding to the cost of the product.

A further object is to avoid the foregoing difficulties and to provide a neat joint.

Other objects and advantages may appear from the subjoined detail description.

The accompanying drawings illustrate the invention.

Figure 1 is a fragmentary side view, partly in axial section of a sucker rod constructed in accordance with this invention, there being two different forms of rolled body members shown. Fig. 2 is an axial section on line indicated by $x^2$, Fig. 1, of the parts, before welding and coupling, from which the sucker rod of Fig. 1 is made. Fig. 3 is an axial section of the upper weld in Fig. 1. Fig. 4 is an axial section of the lower weld in Fig. 1. Fig. 5 is an end view of one of the rod heads from line $x^5$, Fig. 2. Fig. 6 is a cross section on line $x^6$, Fig. 1. Fig. 7 is a fragmentary axial sectional view of a rod head and pipe in telescopic position preparatory for welding together. Fig. 8 is an axial section of the parts in Fig. 7 after welding. Fig. 9 is a fragmentary sectional detail of the lower rod head and coupling box shown in Fig. 1 provided with a latch. The parts are shown in the unlatched position in solid lines and in the latched position in dotted lines.

In Figs. 3, 4 and 8 the dotted lines indicate sectional outlines of the parts previous to welding and the length of metal taken up by the welding operation. Figs. 5, 6, 7 and 9 are on a larger, and Figs. 3, 4 and 8 are on a smaller scale than Figs. 1 and 2. Arrows on the section lines of the various views indicate the direction of sight.

The welding sleeves 1 are preferably formed integral with rod heads 2 which may be drop-forged or otherwise produced and which may be coupled together in any desired manner and in the drawings are shown provided with coupling pins 3 that are adapted to be threaded into a hollow coupling box 4 having an intermediate wrench seat 5 extending part way around the circumference of the box as clearly shown in Fig. 2.

Each rod head 2 is provided with intermediate wrench seats 6, and is extended internally of the welding sleeve 1 to form a welding stub 7, the cross sectional area of which substantially corresponds with the cross-sectional area of the member to be welded thereto, and the welding stub is preferably shorter, and is of smaller diameter than the inside of the sleeve, so as to produce an annular channel 8 which is preferably slightly wedge-shaped or conical and has its outer wall tapering inward toward the inner end of the channel. By reason of the channels 8, the sleeves 1 are adapted to telescopically receive portions of the members which are to be welded to them and to be welded around the ends of said members. Such members may be solid or tubular and may be a rolled body member as shown in Fig. 1 in the form of a flat-bladed rod 9 such as is shown and described in my earlier application for sucker rod, filed January 18, 1912, Serial No. 672,003, or in the form of a cylindrical rod 10 such as is commonly used in connection with oil pumps and other devices, or may be a pipe or tube 11 as in Figs. 7 and 8.

During the welding operation the rolled body member and the stub upset inside the surrounding sleeve which confines the heat and the upset metal, and the stub and the inside of the sleeve weld with the body member wherever the metal of the rolled body comes into contact therewith, and the upset metal so confined prevents crushing in and distortion of the sleeve, thus forming an extremely strong weld and one that requires little or no grinding and smoothing up.

In preparing the sleeve the upper end thereof is tapered and the upset metal entirely fills the end of the sleeve and the tapered portion forms a finish and avoids any obstructing corner at the joint, so that it will pass more readily through the liquid in the pumping operation.

The method of manipulation for gas welding will be understood from the foregoing.

To free the ends of the pin and box from fluid and non-fluid particles which may clog the coupling in practical use, the rod head 2 is provided with a longitudinal slot 12 extending across the threads from the end of the pin 3 into the pin base 13 to form an outlet 14 for particles that have collected in the threads and are forced therefrom into the slot 12 when the box and pin are relatively turned.

In Fig. 9 I have detailed the simple means for preventing unscrewing of the pin and box and for that purpose the slot 12 is terminated at the pin base 13 by a shoulder 15 and the slot is provided with a spring latch 16 having an outwardly bowed spring body 17 adapted to normally engage the pin 3 and the coupling box 4 and having a head 18 which is bent substantially at right angles to the latch body and adapted to be accommodated in the outlet 14 as shown in solid lines when the coupling box and pin are relatively turned to seat the end of the coupling box against the pin base 13. The coupling box 4 is provided with a notch 19 into which, after the box is screwed home, the latch head 18 may be driven or otherwise forced as shown in dotted lines in Fig. 9, so as to rest against the shoulder 15 that holds the spring latch in latching position to effectually prevent relative turning of the pin and box.

It is understood that I do not limit the invention to the production of sucker rods, as the structure shown could be advantageously employed in other arts than that relating to the pumping of wells, and the method can be applied wherever it is desired to weld together two members of different cross-sectional areas or different forms.

The structure thus formed comprises two members united by a welded joint, one of said members being provided with a welding stub, and means to prevent spreading of the weld beyond the circumferential margins of the members, so that a strong, clean weld devoid of external roughness unites the two members into one homogeneous section that is as strong or stronger at the weld than at its other portions.

I claim:—

1. The structure set forth comprising two members of different cross-sectional areas united by a welded joint, one of said members having integral therewith a welding stub and a sleeve surrounding and spaced apart from the stub, said stub and the inside of the sleeve being welded with the other member.

2. The structure set forth comprising two members of different cross-sectional forms united by a welded joint, one of said members having integral therewith a welding stub and a sleeve surrounding and spaced apart from the stub to form a channel to receive and hold the upset metal of the stub and other member.

3. The structure set forth comprising two members united by a welded joint, one of said members having integral therewith an internally tapered sleeve telescoped upon a portion of the other member.

4. The structure set forth comprising two members united by a welded joint, one of said members being provided internally with a channel in which portions of the other member are welded.

5. The structure set forth comprising two members united by a welded joint, one of said members being provided with a welding stub of different cross-sectional form than the other member, and a sleeve around the stub.

6. The structure set forth comprising two members united by a welded joint, one of said members being provided with a welding stub and means to prevent spreading of the weld beyond the circumferential margins of the members.

7. A sucker rod comprising a body member having flat blades united at the axis of the rod, and coupling heads welded over the ends of the body member.

8. A sucker rod comprising a body member, and a coupling head having an internally channeled sleeve welded around the end of the body member.

9. A sucker rod comprising a body member, and a coupling head having a sleeve provided with an internally tapered channel and welded around the end of the body member.

10. A sucker rod comprising a body member, and a rod head telescopically welded inside and outside to the body member.

11. A sucker rod comprising a body member, a sleeve welded to the body member and provided with a tapered portion outside of said body member.

12. A rod head comprising a sleeve and a welding stub inside of and shorter than the sleeve.

13. A rod head comprising a sleeve, and a welding stub inside the sleeve.

14. A structure comprising a coupling head, a body member having flat blades welded to the coupling head, the edges of said flat blades extending radially beyond the coupling head.

15. The structure set forth comprising two members; one of said members having blades, and the other member having a welding stub and having a sleeve surrounding and spaced apart from the stub to form a channel to receive and hold the upset metal of the blades.

16. A sucker rod comprising a flat-bladed body member, and a coupling member having a sleeve and a welding stub inside of the sleeve, said flat-bladed body member being united by a weld to the stub and sleeve of said coupling member.

17. A rod head comprising an internally and externally tapered sleeve.

18. A rod head comprising a sleeve, and a stub inside of the sleeve, said sleeve and stub being spaced apart to form a tapered channel therebetween.

In witness whereof, I have hereunto set my hand at Los Angeles, California, this 5th day of June, 1912.

JOHN HAHN.

In presence of—
   JAMES R. TOWNSEND,
   GEORGE H. HILES.